United States Patent [19]

Ueno et al.

[11] Patent Number: 4,639,814
[45] Date of Patent: Jan. 27, 1987

[54] TAPE RECORDER WITH IMPROVED TAPE CASSETTE PAD SHIFTER

[75] Inventors: Shigeto Ueno; Masanori Ohnishi; Yuji Nakamura; Shinichi Tanaka, all of Osaka, Japan

[73] Assignee: Matsushita Electric Industrial Co., Ltd., Kadoma, Japan

[21] Appl. No.: 467,919

[22] Filed: Feb. 18, 1983

[30] Foreign Application Priority Data

Feb. 19, 1982 [JP] Japan ................................ 57-26279

[51] Int. Cl.[4] .............................................. G11B 15/60
[52] U.S. Cl. ............................ 360/130.1; 360/130.21; 360/130.31
[58] Field of Search ............... 360/109, 104, 105, 128, 360/129, 130.1, 130.2, 130.21, 130.3, 130.31, 130.32

[56] References Cited

U.S. PATENT DOCUMENTS 3,042,753 7/1962 Iwamura .............................. 360/128
3,141,594 7/1964 Berger ................................ 360/130.1
4,307,427 12/1981 Kawachi ............................. 360/128

FOREIGN PATENT DOCUMENTS 3012489 10/1980 Fed. Rep. of Germany ...... 360/105

Primary Examiner—Robert S. Tupper
Assistant Examiner—Andrew L. Sniezek
Attorney, Agent, or Firm—Cushman, Darby & Cushman

[57] ABSTRACT

A magnetic head is fixedly mounted on the cassette holder in a cassette tape recorder. When a tape cassette is inserted into the cassette holder, a magnetic tape is brought into contact with the front face of the magnetic head through an access opening in the tape cassette. In response to selection of stop, fast-forward, and rewind modes of operation, a pad shifter disposed on the cassette holder adjacent to the magnetic head is moved to displace a pad in the tape cassette out of pressed contact with the magnetic tape. When in a recording or playback mode of operation, the pad shifter is retracted to allow the pad to resiliently press the magnetic tape against the magnetic head. The tape recorder is rendered small in size particularly in the transverse direction of the tape cassette inserted.

2 Claims, 11 Drawing Figures

TAPE RECORDER WITH IMPROVED TAPE CASSETTE PAD SHIFTER

BACKGROUND OF THE INVENTION

The present invention relates to a tape recorder using tape cassettes for recording and reproducing information.

Portable tape recorders are now in wide use, and there are still continuing demands for smaller portable, especially hand-held, tape recorders. To meet such demands, various efforts have been made to make portable tape recorders smaller in size, as closely to the size of the tape cassette itself as possible.

The tape cassettes can be set into place in various directions dependent on the tape recorders used. However, the magnetic head mechanism in the tape recorders is normally constructed such that the magnetic head is movable into contact with a magnetic tape through an access opening in the cassette case in response to recording or playback operation. Accordingly, the interval or stroke that the magnetic head is movable back and forth should be reserved in the portable cassette tape recorder. This dimensional limitation has been an obstacle to attempts to render the tape recorder smaller in size, and has generally been considered unchallengeable.

SUMMARY OF THE INVENTION

It is an object of the present invention to provide a tape recorder which is reduced in transverse dimension with a magnetic head fixed in place.

Another object of the present invention is to provide a tape recorder having a fixed magnetic head capable of tracing the tracks on a magnetic tape highly accurately.

According to the present invention, a magnetic head is fixedly mounted on a cassette holder, and a pad shifter and a pinch roller are pivotably mounted on the cassette holder. When a tape cassette is received in the cassette holder, the magnetic tape is held against the front face of the magnetic head through an access opening in the tape cassette. In response to selection of a recording or playback mode of operation, the pad shifter is actuated to allow a pad in the tape cassette to press the magnetic tape against the magnetic head. When a stop, fast-forward, or rewind mode of operation is selected, the pad shifter is moved to displace the pad out of pressed contact with the magnetic tape.

BRIEF DESCRIPTION OF THE DRAWINGS

The present invention will be described in detail by way of illustrative example with reference to the accompanying drawings, in which.

DETAILED DESCRIPTION

Figure 1:
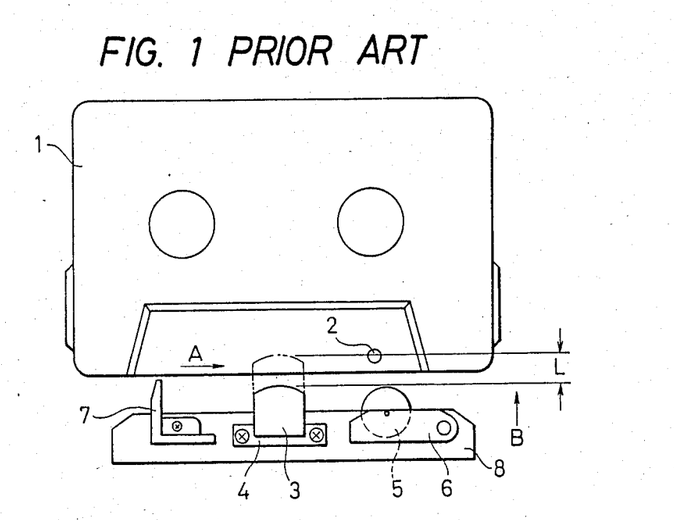
FIG. 1 is a fragmentary plan view of the magnetic head mechanism of a conventional portable cassette tape recorder with a tape cassette set in place, the magnetic head mechanism being at rest.
Figure 2:
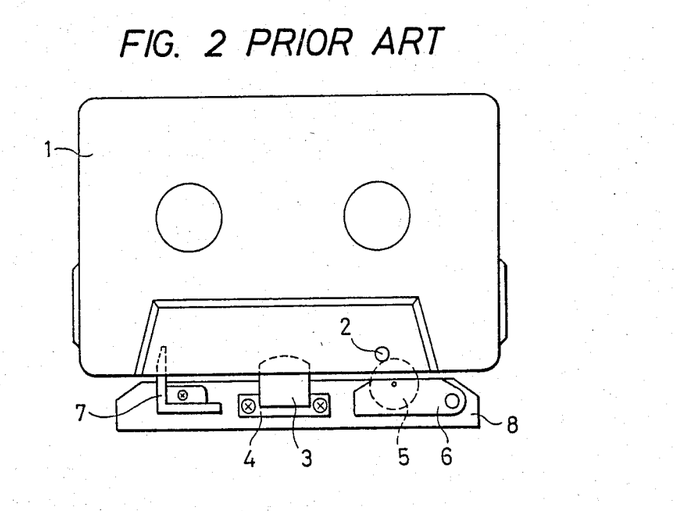
FIG. 2 is a fragmentary plan view of the magnetic head mechanism of FIG. 1 as it is advanced in a recording or playback mode of operation.

FIGS. 1 and 2 show the magnetic head mechanism of a conventional tape recorder with a tape cassette 1 mounted in place. The magnetic head mechanism is shown in FIG. 1 as being held at rest, and shown in FIG. 2 as being positioned in a recording or playback mode of operation. A capstan 2 projects upwardly from a base plate (not shown) of the tape recorder. The magnetic head mechanism comprises a magnetic head 3 mounted on a head seat 4 secured to a head plate 8, a pinch roller 5 rotatably supported on a pinch roller arm 6 rotatably mounted on the head plate 8, and a tape guide 7 fixedly disposed on the head plate 8 upstream of the magnetic head 3 in the direction of travel of a magnetic tape (not shown), that is, in the direction of the arrow A (FIG. 1). In a stop mode of operation, the head plate 8 is positioned away from the tape cassette 1 as shown in FIG. 1. When a recording or playback mode of operation is selected, a drive unit such as a motor and a signal processing circuit such as an amplifier are energized, and the head plate 8 is caused to slide in the direction of the arrow B (FIG. 1) toward the tape cassette 1 until the magnetic head 3, the pinch roller 5, and the tape guide 7 are brought into engagement with the magnetic tape through acess openings in the cassette case, as illustrated in FIG. 2. Upon selection of the stop mode while the parts are in the recording or playback position, the head plate 8 is retracted from the position of FIG. 2 to the position of FIG. 1. In a fast-forward or rewind mode, the head plate 8 is in the position of FIG. 1.

With the illustrated prior tape recorder construction, the head plate 8 must be in the retracted position for inserting and removing the tape cassette 1. The conventional cassette tape recorder therefore requires a space which provides for the interval or stroke L (FIG. 1) of movement of the head plate 8. The stroke L has been a great obstacle to efforts to render the tape recorder smaller in size, particularly in the transverse direction of the tape cassette.

The present invention will now be described with reference to FIGS. 3 through 9B.

Figure 3:
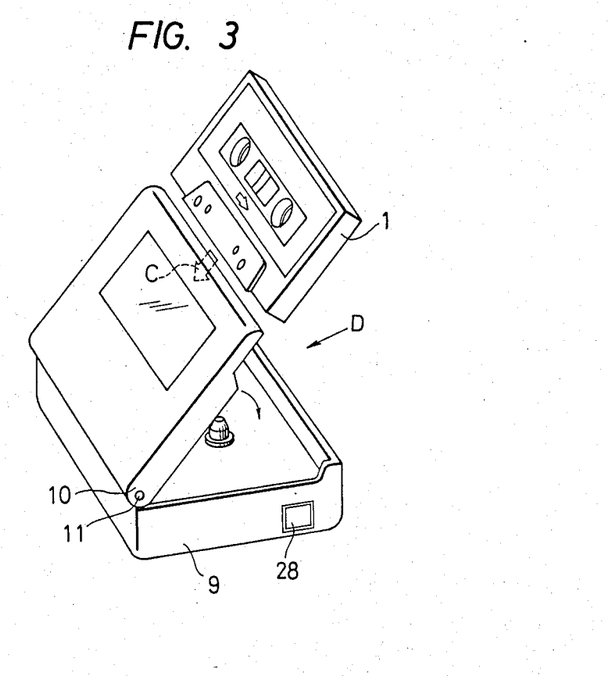
FIG. 3 is an isometric view of a tape recorder according to the present invention, the tape recorder being open with a tape cassette about to be inserted into the tape recorder.
Figure 4:
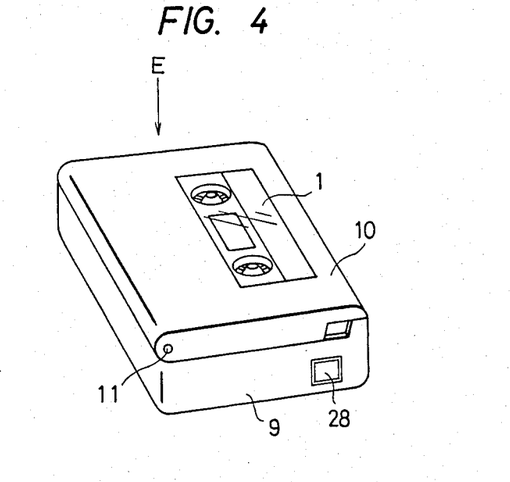
FIG. 4 is an isometric view of the tape recorder shown in FIG. 3 which is closed with the tape cassette contained therein.

FIG. 3 shows a casstte tape recorder according to the present invention. The tape recorder is composed of a tape recorder body 9 and a cassette cover 10 pivotably mounted by pins 11 on the tape recorder body 9, the cassette cover 10 having therein a cassette holder 12 (FIG. 5) for holding a tape cassette 1. The tape cassette 1 can be inserted in the direction of the arrow C into the cassette cover 10 and retained by the cassette holder 12. In FIG. 4, the cassette cover 10 with the tape cassette 1 held therein is closed, and the tape recorder is readied for operation.

Figure 5:
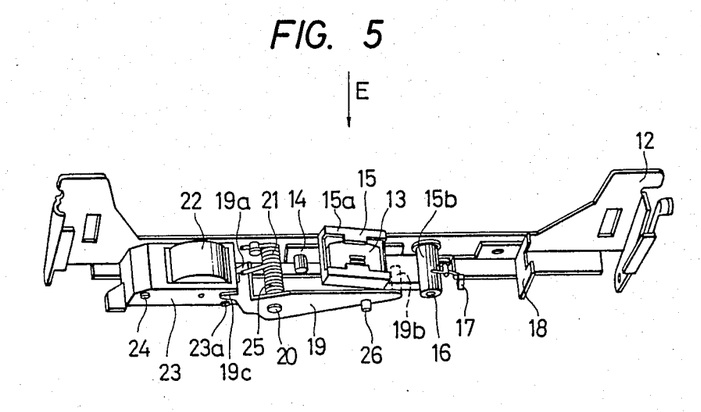
FIG. 5 is a perspective view of a tape cassette holder in the tape recorder of FIG. 3.
Figure 6:
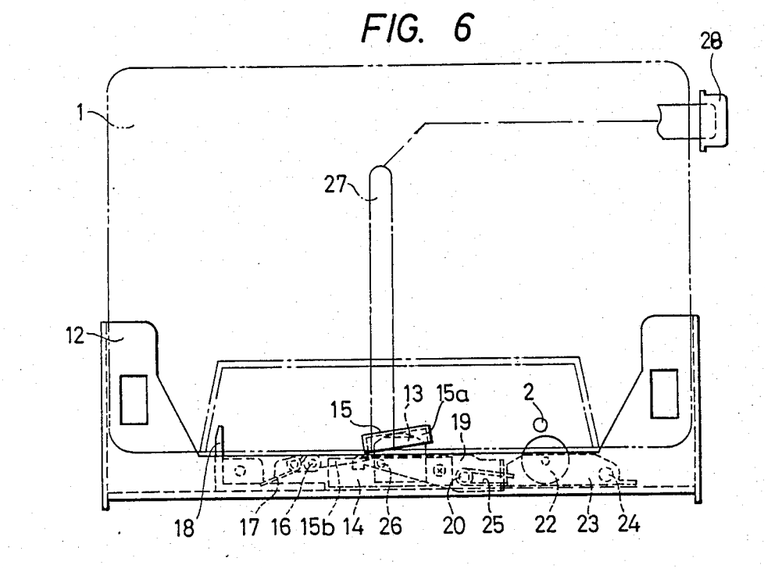
FIG. 6 is a plan view of the tape cassette holder shown in FIG. 5.

FIG. 5 is a perspective view of the cassette holder 12 as seen in the direction of the arrow D of FIG. 3, and FIG. 6 is a plan view of the cassette holder 12 as seen in the direction of the arrow E of FIG. 4. A magnetic head 13 is fixed to a head seat 14 secured to the holder 12. A pad position control member or pad shifter 15 is composed of a pad presser 15a extending in surrounding relation to a front portion of the magnetic head 13 and a support 15b integrally formed with the pad presser 15a and pivotably fitted over a pin 16 attached to the cassette holder 12. A torsion coil spring 17 acts between the support 15b and a tape guide 18 mounted on the cassette holder 12 for normally urging the pad shifter 15 to turn its pad presser 15a toward the magnetic head 13. The torsion spring 17 is disposed on the support 15b remotely from the pad presser 15a across the pin 16 and has one end held in engagement with the support 15b and the other end engaging the tape guide 18.

A control arm 19 is angularly movably supported on a pin 20 mounted on the cassette holder 12 remotely from the pin 16 across the magnetic head 13. The control arm 19 serves to control the position of the pad shifter 15 and a pinch roller (describer later). The control arm 19 has an engaging portion 19a on one end thereof bent substantially parallel to the pin 20 and a presser 19b at the opposite end. A torsion coil spring 21 is disposed around the pin 20 and has one end fixed to the cassette holder 12 and the other end held against the engaging portion 19a of the control arm 19. The torsion coil spring 21 serves to normally bias the control arm 19 in a direction to turn and cause the presser 19b to push the support 15b of the pad shifter 15 against the resiliency of the spring 17. The spring 21 can provide a resilient force greater than that of the spring 17, so that the pad presser 15a of the pad shifter 15 is normally lifted off and projects in front of the magnetic head 13, as shown in FIGS. 5 and 6.

A pinch roller 22 is rotatably mounted on a pinch roller arm 23 pivotably supported on a pin 24 fixed to the cassette holder 12. The pinch roller arm 23 has an engagement pin 23a held in engagement with a lever 19c of the control arm 19 adjacent to the engaging portion 19a. The lever 19c is biased under the resiliency of the spring 21 to press down the engagement pin 23a for thereby retracting the pinch roller 22 in a direction away from the magnetic tape. Another torsion coil spring 25 is disposed around the pin 20 and has one end engaging the engaging portion 19a and the other end engaging the pinch roller arm 23. The torsion coil spring 25 serves to press the pinch roller 22 against a capstan 2 with the magnetic tape therebetween under a predetermined force or pinch roller pressure. The spring 21 has a resiliency greater than that of the spring 25, so that the pinch roller 22 is retracted as shown in FIG. 5 when the parts are in the stop position.

The control arm 19 has a pin 26 near the presser 19b. A connector rod 27 is slidably mounted in the tape recorder and has one end disposed in confronting relation to the pin 26. The connector rod 27 is operatively and conventionally connected to and can be actuated by a control button 28 which is depressed by the operator when a recording or playback mode is selected.

Figure 7A:
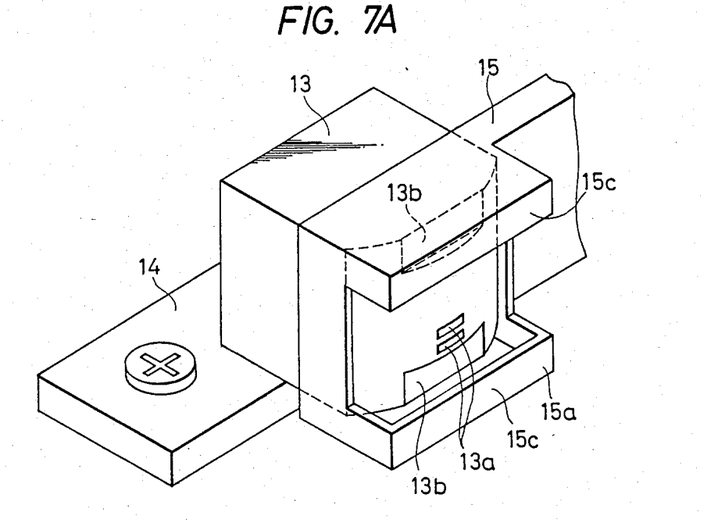
FIG. 7A is an enlarged fragmentary perspective view of a magnetic head.
Figure 7B:
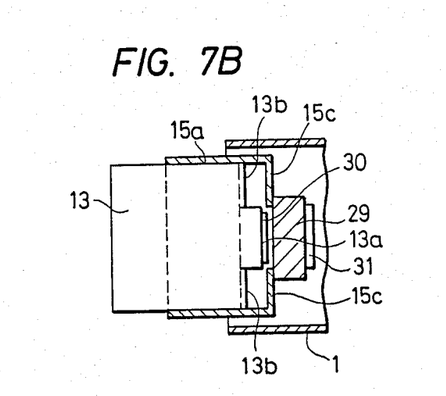
FIG. 7B is a fragmentary transverse cross-sectional view of the magnetic head of FIG. 7A.

FIGS. 7A and 7B show the magnetic head 13 and the pad shifter 15 in an enlarged scale. The magnetic head 13 has head gaps 13a, and a pair of upper and lower recesses 13b in a front face thereof. The pad presser 15a has a pair of confronting edges 15c spaced from each other across the magnetic head 13. The edges 15c are placed in the recesses 13b, respectively, when the pad shifter 15 is angularly moved back about the pin 16. When the tape cassette 1 is inserted in the cassette holder 12, as shown in FIG. 7B, the pad presser 15a is in the projecting position under the force of the spring 21. The transverse space between the edges 15c of the pad shifter 15 is smaller than the width of a pad 29 in the tape cassette 1 and larger than the width of a magnetic tape 30, as shown in FIG. 7B. Therefore, the pad 29 is pushed off the magnetic tape 30 by the edges 15c of the pad shifter 15 while the magnetic tape 30 is allowed to be held against the front face of the magnetic head 13 between the edges 15c of the pad shifter 15. The pad 29 is normally urged against the magnetic tape 30 by a resilient plate 31 (FIG. 7B) mounted in the tape cassette 1.

Figure 8:
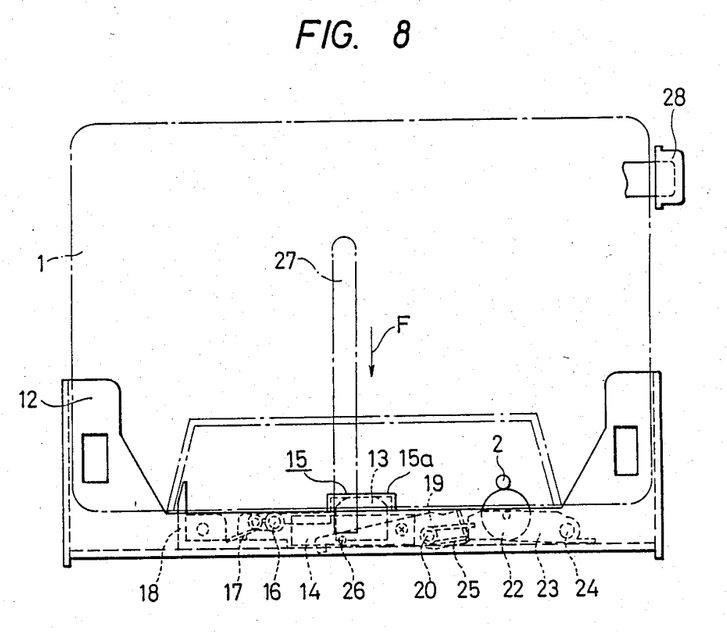
FIG. 8 is a plan view of the holder as it is positioned in recording and playback modes of operation.
Figure 9A:
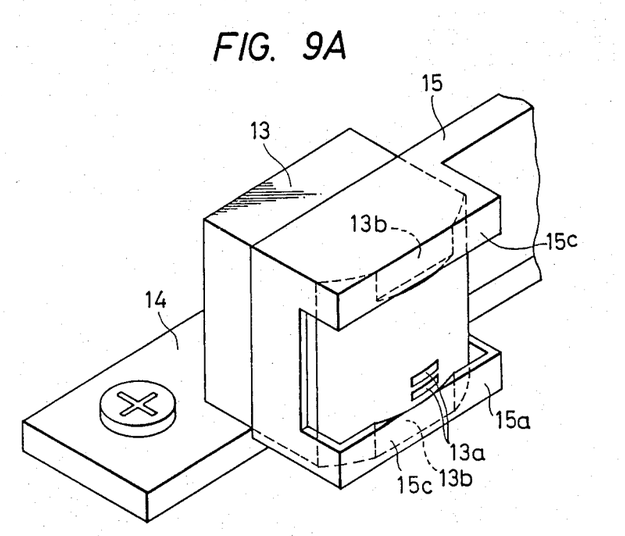
FIG. 9A is a perspective view of the magnetic head in the recording and playback modes of operation.
Figure 9B:
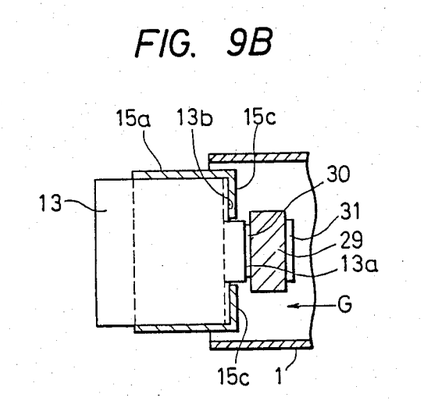
FIG. 9B is a fragmentary transverse cross-sectional view of the magnetic head of FIG. 9A.

Recording and playback modes of operation will now be described with reference to FIGS. 8 and 9A, 9B. When the control button 28 is depressed, the connector rod 27 is caused by a mechanism (not shown) to slide in the direction of the arrow F (FIG. 8) to push at its end the pin 26 on the control arm 19, which is then angularly moved about the pin 20 under the resiliency of the spring 21. The presser 19b of the control arm 19 is retracted to permit the pad presser 15b to turn toward the magnetic head 13 under the biasing force of the spring 17, whereupon the pad shifter 15 is turned about the pin 16 under the force of the spring 17. The pad presser 15a is withdrawn until the edges 15c thereof enter the recesses 13b, respectively, in the front face of the magnetic head 13, as shown in FIG. 9A. Upon retraction of the pad presser 15a, the magnetic tape 30 is pressed against the front face of the magnetic head 13 by the pad 29 which has shifted in the direction of the arrow G (FIG. 9B) under the force of the resilient plate 31.

The depression of the pin 26 also causes the lever 19c to move forward and release the engaging pin 23a on the pinch roller arm 23. The pinch roller arm 23 is now turned about the pin 24 by the spring 25 until the pinch roller 22 is held against the capstan 2 with the magnetic tape 30 interposed therebetween under the preset pressure.

Simultaneously with the actuation of the control button 28, a reel shaft and the capstan 2 are rotated by the drive unit to feed and wind the magnetic tape 30 which passes between the capstan 2 and the pinch roller 22 at a constant speed. With the pad shifter 15 retracted, the magnetic tape 30 is held by the pad 29 in sliding contact with the front face of the magnetic head 13, a position ready for recording or playback.

When the stop mode is selected while in the recording or playback mode, the control button 28 is released by the operator to move the connector rod 27 in a direction opposite to the direction of the arrow F to release the pin 26. The parts are now returned to the position shown in FIGS. 5 and 6. The pinch roller 22 is moved away from the capstan 2, and the pad 29 is retracted away from the magnetic head 13. While the position of FIGS. 5 through 7 has been described as indicating the stop mode, other modes such as fast forward, rewind, cue, and review modes can be selected in the illustrated position. For example, in the cue mode, a reel base is driven by the motor at a high speed to feed the magnetic tape 30 at a high rate with the pinch roller 22 spaced away from the capstan 2. Since the magnetic tape 30 is in contact with the front face of the magnetic head 13, a playback output can be picked up from the magnetic head 13 and amplified for a cueing operation. The parts will be in the fast-forward mode when the playback output is muted or eliminated in the cue mode. The review and rewind modes can be effected in the similar manner.

With the arrangement of the present invention, the magnetic head 13 remains fixed at all times when the tape cassette is inserted or removed and in all modes of operation, the pad shifter 15 being angularly actuatable to control the pad 29 in the tape cassette. Since the magnetic head 13 is immovable, the stroke or distance L (FIG. 1) that would otherwise be reserved for the movement of the magnetic head through the access opening in the tape cassette is eliminated, and the dimension of the tape recorder in the transverse direction of the tape cassette inserted is greatly reduced. With the magnetic head 13 fixed to the cassette holder 12, the gaps 13a in the magnetic head 13 can be positioned to a nicety with respect to tracks on the magnetic tape 30, thus ensuring highly accurate tracing of a desired track. The pad presser 15a of the pad shifter 15 is disposed in surrounding relation to the magnetic head 13, and the edges 15c of the pad presser 15a can be received respectively in the recesses 13b in the front face of the magnetic head 13. This construction, together with the fact that the pad shifter 15 is angularly movable through a small angular interval, allows a reduction in the size of the tape recorder in the transverse direction of the tape cassette inserted. The reduction in the transverse dimension of the tape recorder is also attributable to the placement of the pin 16 opposite to the pin 20 across the magnetic head 13.

In the illustrated embodiment, the pad shifter 15 is in the advanced position in the normal stop mode and is retracted in the recording and playback modes. However, the pad shifter 15 may be modified such that it is normally in the retracted position and is advanced when a fastforward or rewind mode is selected.

Although a certain preferred embodiment of the present invention has been shown and described in detail, it should be understood that various changes and modifications may be made therein without departing from the scope of the appended claims.

What is claimed is:
1. A tape recorder for use with a tape cassette including a case having an access opening and a magnetic tape and a resiliently biased pad disposed in the case, the tape recorder having a plurality of different modes of operation, comprising:
  (a) a base comprising a cassette holder for receiving the tape cassette;
  (b) a magnetic head fixedly mounted on said base for contact with the magnetic tape through the access opening when the tape cassette is inserted in the tape recorder;
  (c) a pad position control member movably mounted on said base for displacing the pad through the access opening when the tape cassette is inserted in the tape recorder, said pad position control member including a pad presser having a pair of opposite edges spaced from each other by a distance smaller than the width of said resiliently biased pad;
  (d) means responsive to selection of at least one of the tape recorder modes for actuating said pad position control member in a first direction to allow the pad to press the magnetic tape against said magnetic head through the acess opening and between said edges of said pad presser and also responsive to selection of at least one of the other tape recorder modes for actuating said pad position control member in a second direction opposite to said first direction to enable said pad presser to displace the pad out of pressing contact with the magnetic tape, said means comprising a first spring acting between said cassette holder and said pad position control member for normally urging the latter in said first direction, a control arm movably mounted on said base and engaging said pad position control member, a second spring acting between said cassette holder and said control arm for normally urging said control arm in said second direction, said second spring having a resiliency larger than that of said first spring for enabling said control arm to be displaced in said second direction to a stop mode of operation, and an operator-controlled rod movable in response to selection of recording playback modes of operation for pressing said control arm in said first direction against the resiliency of said second spring to permit said pad position control member to move in said first direction under the resiliency of said first spring, whereby the pad is allowed under its own resiliency to press the magnetic tape against said magnetic head;
  (e) said eassctte holder including a pair of first and second pins, said pad position control member comprising a pad presser positioned adjacent to said magnetic head and engageable with the pad and a support supporting said pad presser and pivotably mounted on said first pin, said first spring engaging said support, said control arm being pivotably mounted on said second pin and having a presser held in engagement with said pad position control member, said second spring being mounted on said second pin; and
  (f) said magnetic head having a pair of recesses spaced from each other for receiving therein said edges, respectively, of said pad presser when said pad position control member is moved in said first direction.

2. A tape recorder for use with a tape cassette including a case having an access opening and a magnetic tape and a resiliently biased pad disposed in the case, the tape recorder having at least stop and actuated modes of operation, comprising:
  (a) a cassette holder for receiving the tape cassette therein, said cassette holder having first, second and third pins;
  (b) a magnetic head fixedly mounted on said cassette holder between said first and second pins for contact with the magnetic tape through the access opening when the tape cassette is received in said cassette holder, said magnetic head having a pair of recesses spaced from each other;
  (c) a pad position control member movably mounted on said cassette holder for displacing the pad through the access opening when the tape cassette is received in said cassette holder, said pad position control member including a pad presser disposed in surrounding relation to said magnetic head and having a pair of opposite edges spaced from each other by a distance smaller than the width of said resiliently biased pad, and a support supporting said pad presser and pivotably mounted on said first pin,
  (d) a first spring acting between said cassette holder and said pad position control member for normally urging the latter in a first direction toward said magnetic head to allow the pad to press the magnetic tape against said magnetic head;

(e) a control arm pivotably mounted on said second pin and having a presser engageable with said support of the pad position control member and a lever remote from said presser across said second pin;

(f) a second spring acting between said cassette holder and said control arm for normally urging the latter in a second direction away from said magnetic head to cause said pad presser to displace the pad out of pressing contact with the magnetic tape which is held against said magnetic head between said edges, said second spring having a resiliency greater than that of said first spring;

(g) a capstan;

(h) a pinch roller arm pivotably mounted on said third pin and engaged by said lever;

(i) a pinch roller rotatably supported on said pinch roller arm;

(j) a third spring acting between said cassette holder and said pinch roller arm for normally urging said pinch roller toward said capstan, said third spring having a resiliency smaller than that of said second spring; and (k) an operator-controlled rod movable in response to selection of the actuated mode of operation for pressing said control arm in said first direction against the resiliency of said second spring to allow said pad presser to move in said first direction to place said edges respectively in said recesses under the resiliency of said first spring and also allow said pinch roller to be held against said capstan with the magnetic tape therebetween under the resiliency of said third spring, and also movable in response to selection of the stop mode of operation for releasing said control arm to cause said pad presser to move in said second direction and said pinch roller to move away from said capstan under the resiliency of said second spring.

* * * * *